United States Patent [19]

Dennis et al.

[11] Patent Number: 4,501,454
[45] Date of Patent: Feb. 26, 1985

[54] METHOD OF DISTRIBUTING LOAD AMONG STACKED BEARINGS

[75] Inventors: James G. Dennis, Pottsboro; Kenneth W. Bramlett, Arlington; G. C. Jackson, Jr., Dallas, all of Tex.

[73] Assignee: Dresser Industries, Inc., Dallas, Tex.

[21] Appl. No.: 546,683

[22] Filed: Oct. 28, 1983

[51] Int. Cl.³ .............................................. F16C 19/10
[52] U.S. Cl. ................. 384/619; 308/DIG. 8; 384/621
[58] Field of Search ......... 308/227, 235, 230, DIG. 8, 308/219, 233, 234

[56] References Cited

U.S. PATENT DOCUMENTS

| | | |
|---|---|---|
| 2,908,534 | 10/1959 | Rietsch . |
| 3,356,338 | 12/1967 | Ioanesvan et al. ................ 253/3 |
| 3,362,488 | 1/1968 | Ioanesvan et al. ................ 175/93 |
| 3,630,634 | 12/1971 | Mayall ............................. 415/170 |
| 3,754,835 | 8/1973 | Ivanov et al. .................... 415/122 |
| 3,879,094 | 4/1975 | Tschirky et al. ................. 308/230 |
| 3,936,247 | 2/1976 | Tschirky ......................... 418/48 |
| 3,944,303 | 3/1976 | Ioanesian et al. ............... 308/6 A |
| 4,120,542 | 10/1978 | Bhateja et al. ................. 308/235 |
| 4,240,683 | 12/1980 | Crase ............................ 308/227 |
| 4,265,498 | 5/1981 | Luce et al. ..................... 308/230 |
| 4,363,608 | 12/1982 | Mulders ......................... 308/227 |

Primary Examiner—Lenard A. Footland
Attorney, Agent, or Firm—Fred A. Winans

[57] ABSTRACT

A series of axially stacked rolling bearing assemblies for transmitting axial thrust load between relative rotating cylinders, such as in a fluid powered downhole motor, is provided with the bearing races of each assembly formed from a bearing material significantly softer than the balls thereof so as to readily wear to a condition wherein the thrust load is generally equally distributed throughout each assembly within the stack.

15 Claims, 3 Drawing Figures

4,501,454

METHOD OF DISTRIBUTING LOAD AMONG STACKED BEARINGS

TECHNICAL FIELD

The present invention in general relates to roller bearing structure, and more particularly, to such bearing structure in an axially stacked arrangement for transmitting thrust load between relatively rotating members such as in a downhole drilling motor.

BACKGROUND OF THE INVENTION

Oil and gas well drilling in the United States conventionally involves the rotation of a drill string pipe with a rotary drill bit at the bottom end. An engine or motor at the surface turns or rotates the entire drill string while turning the rotary drill bit at the bottom of the borehole. A drilling fluid generally called drilling mud is pumped downhole and out through ports in the drill bit to bring rock cuttings to the surface. As the drilling mud leaves the ports in the rock bit, the mud picks up and carries the rock material loosened by the rock bit to the surface, and cools the bearings of the rock bit. The mud lubricates the sides of the borehole reducing the friction between the sides of the borehole and the rotating drill string. At times, circumstances make it desirable to drive the drill bit at speeds that differ from the speed of the drill string, or it may be that the drill string need not be rotated. A downhole motor may accomplish this by placing the downhole motor at or near the bottom of the drill string. The motor may be electric or hydraulic. If it is a hydraulic motor, it may be a turbine, a positive displacement vane, or a Moineau motor. All motors have a power section with a stator and a rotor which produce torque and rotation between them; thrust and radial bearings between stationary and rotating members; a flow path for the drilling fluid from the drill string to the drill bit which path may be through the power section, and through or partially through the bearings.

The bearings can be isolated from the drilling fluid, with its contaminants which are hostile to the function and life of the bearings, by seals; however, effective seals complicate the design and are notorious for creating torque losses and expensive repairs usually result when failure occurs. It must be appreciated that a method of extending the operating life of the motor is important because premature failure of the motor while downhole causes expensive downtime on the drilling rig.

DESCRIPTION OF PRIOR ART

In U.S. Pat. No. 3,630,634 issued Dec. 28, 1971 to William Mayall, he discusses a bearing structure for a downhole motor wherein a high axial load is being distributed through the bearing structure. The patent acknowledges that one or more of the track members or sets of bearing balls can wear to a greater extent than the others causing the axial load to be distributed through the bearing stack so as to avoid the breaking up of the worn elements and total failure of the worn elements and its neighbors; however, to accommodate the total (i.e. thrust plus radial) load, Mayall forms the various bearing structure members from an extremely hard wearing material such as tungsten carbide. The difficulty of machining and assembling bearing parts within tolerances close enough to provide a bearing package that will distribute the bearing load between the bearings is overwhelming. Further, such hard bearing materials for roller bearing members contributes to high unit loading which causes premature failure through a mode other than wear (i.e. fatigue). The use of bearing components made from very hard, high wear resistance material thus does nothing but contribute to continued uneven loading and failure of bearing components.

SUMMARY OF THE INVENTION

The present invention provides an improved stacked series of rolling bearing assemblies wherein at least one of the races of each rolling bearing assembly is formed from a metal substantially softer than the rolling elements. Such soft material of the bearing assembly of the stack is readily worn so that, due to the axial relocation of the rotating members permitted by this wear, the load is distributed to the next loaded assembly in the stack for like wear. With such soft race material, over a relatively short period of time the races of each assembly are all worn to a position wherein the load is generally equally distributed throughout the stack without inducing spalling or fatigue failure of the bearing components.

Further, constructing bearings in accordance with this invention provides a bearing package that overcomes the manufacturing and assembling difficulties in prior assemblies wherein load is distributed by maintaining close tolerances. The invention provides particular utility in a bearing package of a downhole motor that would allow the downhole motor a relative long run without having to replace the bearings.

DETAILED DESCRIPTION OF THE PREFERRED EMBODIMENTS

Figure 1:
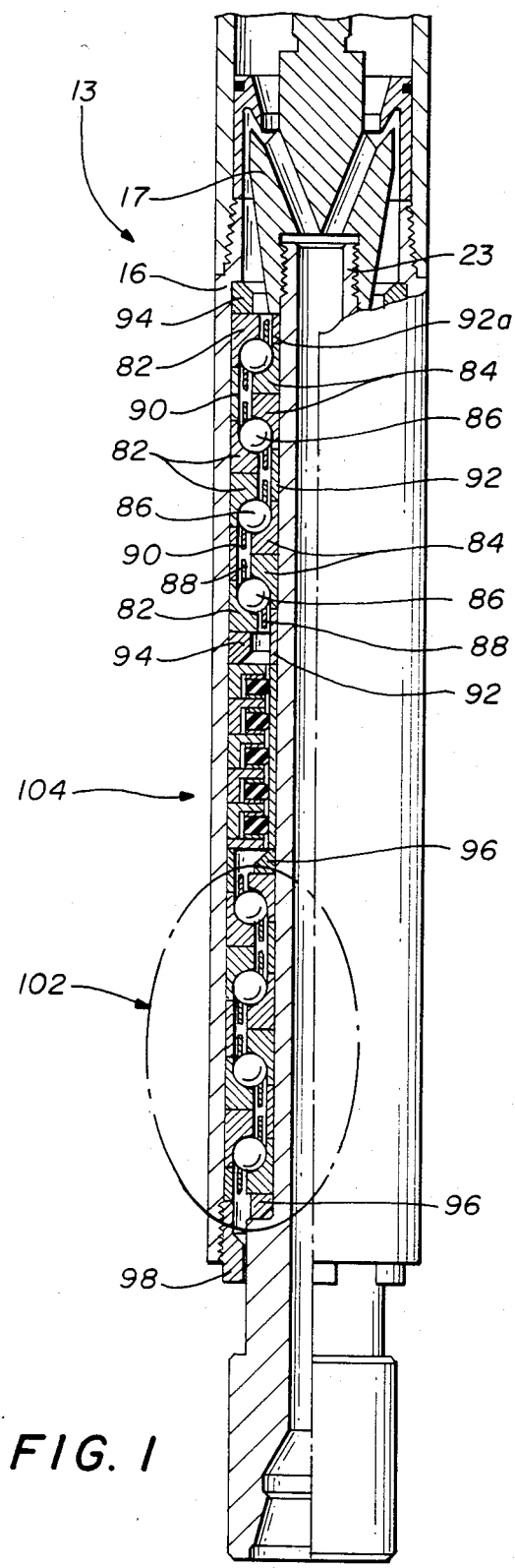
FIG. 1 is a longitudinal view illustrating a partial view of the bearing and fluid restrictor portion of a downhole motor.

Referring to FIG. 1, the bearing and restrictor section of a downhole motor is illustrated and generally designated by reference number 13. (For a more complete description of a downhole motor, see U.S. Pat. No. 4,260,031 of common assignee to the present invention.) As therein seen, upper and lower bearing stacks 100, 102 are disposed in a non-sealed bearing section between an outer cylindrical housing 16 and an inner bit shaft 23. The bearing stacks transmit the axial thrust load between the respective cylindrical members while supporting them for relative rotation. Each bearing stack 100, 102, includes a series of axially stacked bearing assemblies, with each assembly comprising balls 86 disposed in an annular array within a ball cage 88 between an outer bearing race 82 and an inner bearing race 84 and inner annular spacer members 92 or outer annular spacer members 90 axially selectively disposed between adjacent assemblies such that axial thrust is transmitted through the stack in a preferred path to be discussed with reference to FIGS. 2 and 3. It is also noted that the upper bearing stack 100 is retained in proper disposition as being captured between upper and lower outer race supports 94 secured to the housing 16 whereas the lower bearing stack 102 is retained between upper and lower inner race supports 96 secured to the bit shaft 23.

A fluid restrictor section 104 is disposed between upper bearing stack 100 and lower bearing stack 102 to control the flow of fluid through the bearings for lubrication and for flushing wear debris therefrom. Reference may be had to co-pending application entitled "Downhole Motor Fluid Flow Restrictor" Ser. No. 545794, filed Oct. 26, 1983 of common assignee with the present invention.

For the purposes of distributing the axial thrust load generally equally amongst the bearing assemblies of each stack and also amongst the bearing assemblies of both stacks it is preferred to form the inner and outer ball races 82 and 84 from a through hardening steel in a hardness range of 42 to 46 Rockwell C hardness. Such a steel is commonly commercially available under the trade name Astralloy-V sold by the Astralloy-Vulcan Corporation, Red Hollow Road, Birmingham, Ala. 35217. Astralloy-V has the following analysis:

C 0.20/0.29; Mn 0.80/1.20; P 0.025 max; S 0.025 max; Si 0.20/0.40; Ni 3.25/4.00; Mo 0.25/0.50; Cr 1.25/2.00; and Fe balance.

These races were used with balls fabricated from modified AISI S2 tool steel having a hardness of 56 to 60 Rockwell C and with the following analysis: C 0.45/0.55; Mn 0.30/0.60; Si 0.90/1.15; P 0.03 max.; S 0.03 max; Mo 0.30/0.50; Ni 0.35 max.*; V 0.07/0.13*; balance Fe., *Ni and V are optional. Such steel is readily commercially available from the Carpenter Steel Company, Reading, Pa.

It should be noted that there are two conditions of operation wherein axial thrust load is transmitted through the bearings from the outer housing 16 to the bit shaft 23 as explained in the previously-identified co-pending application. As therein explained, the fluid pressure on the effective area of the restrictor section produces a piston effect which, in the arrangement of the restrictor section 104, would force an outward or downwardly telescoping movement of the bit shaft with respect to the housing 16. However, when the weight of the bit exceeds this piston effect, as during the normal drilling operation, there is a resultant force tending to move the bit shaft upwardly with respect to the housing as viewed in FIG. 1.

Figure 2:
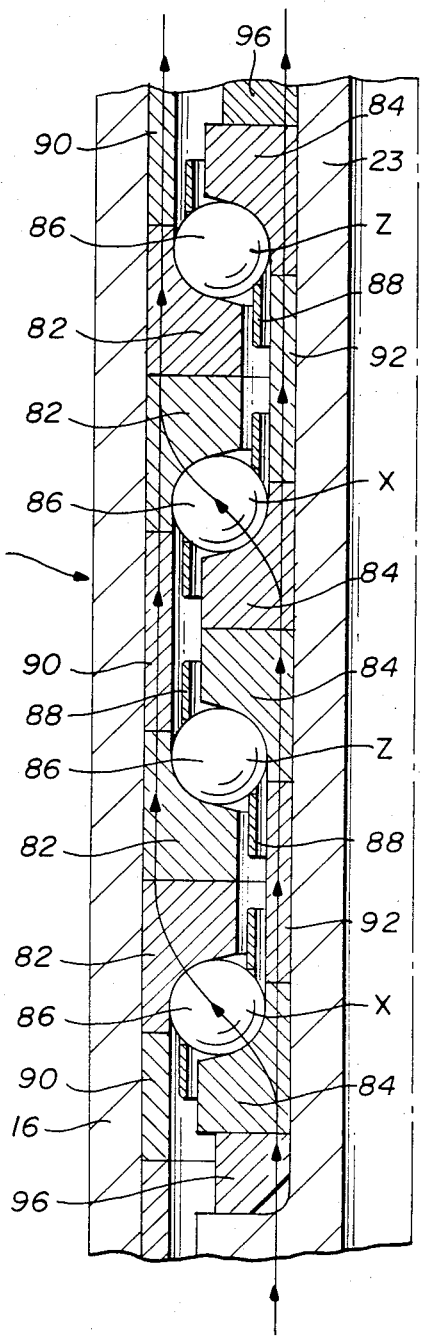
FIG. 2 is an enlarged section of the lower bearing structure of the downhole motor of FIG. 1 with arrows depicting thrust forces on the bearing structure in one condition.
Figure 3:
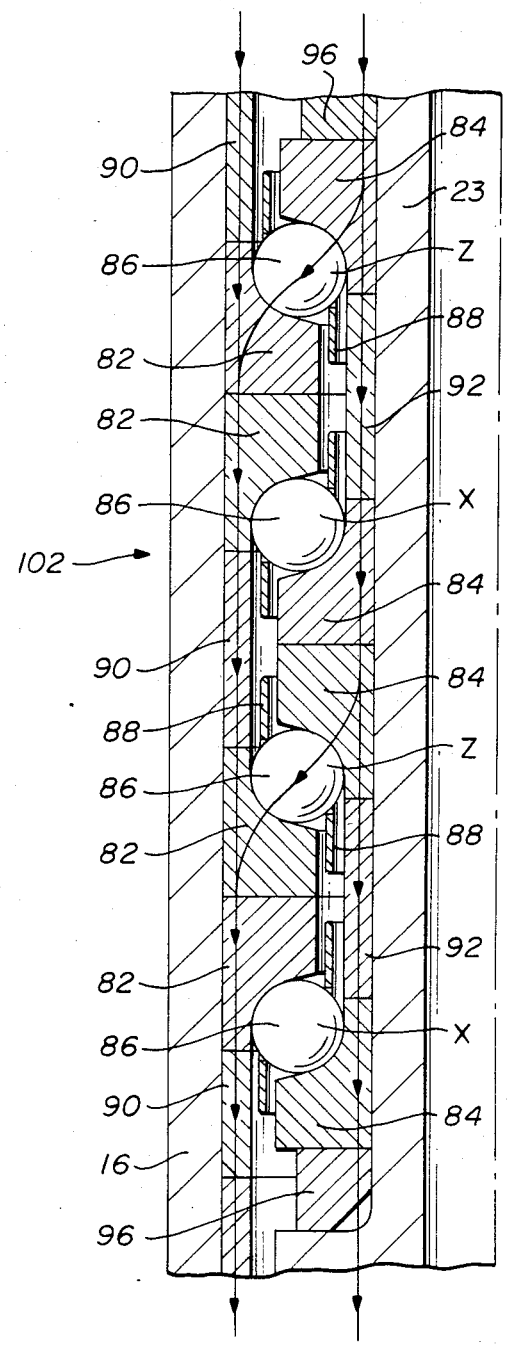
FIG. 3 is a view similar to FIG. 2 with arrows depicting thrust forces on the bearing structure in another condition.

In this latter instance, the axial thrust is transmitted to the bearings in the following manner, with reference particularly to FIG. 2 wherein the upwardly directed arrows depict the forces as they are transmitted through the bearing arrangement: the upward force is transmitted from the bit shaft 23 to the lower inner race support 96 and from there to the lower inner race 84. From there the force is transmitted partially through the ball array 86 (also designated X) into the upper outer race 82 with a residual force being transmitted from the lower inner race through the spacer member 92 to an upper inner race of the next adjacent bearing assembly housing a ball array 86 (designated Z). The force transmitted through the balls X and into the upper outer race 82 is likewise transmitted to the lower outer race 82 of the bearing assembly for balls Z and thence through the spacer outer 90 and into the outer upper race of the next bearing assembly in the series enclosing balls X. (It is to be noted that separation of the ball centers of adjacent assemblies [i.e. balls X, Z] by selecting inner and outer space lengths precludes loading such adjacent balls under unidirectional thrust conditions.) The force in the upper inner race of the previous bearing Z is partially transmitted to the lower inner race of this next bearing X and then through the ball array 86 or X to the upper outer race, with a residual force being transmitted through the inner spacer 92 and into the upper inner race of the uppermost bearing assembly and into inner restrictor members of restrictor section 104. The thrust force in the upper outer race of the previous bearing housing balls X is transmitted through the lower outer race of this last bearing assembly (housing balls Z) and thence through the spacer thereabove and thereafter transmitted through the outer restricter members and into the upper bearing stack 100 for like force transmission therethrough.

In the instance where the piston effect exceeds the weight-on bit, the tendency will be to telescope the bit shaft outwardly from the housing 16. In this instance the axial thrust forces are transmitted through bearing stack in the following manner with particular reference to FIG. 3 wherein force transmission is depicted by the downwardly directed arrows: the thrust forces coming from the restrictor portion place a downward force on the outer spacer and the upper inner race support 96 thereby transmitting a downward force to the lower outer race of the initial bearing array 86 also designated Z and to the upper inner race of the initial bearing Z. From the upper inner race the force is transmitted through the ball array 86 or Z of the first bearing and into the lower outer race with a residual force being transmitted downwardly through the spacer member 92 and thence through the lower inner race of the next adjacent bearing housing balls X. From the lower outer race of the first bearing Z the force is transmitted through the upper outer race and thence through the outer spacer member 90 and into the lower outer race 82 of the next bearing Z. From the lower inner race of the preceding bearing X, the force is transmitted to the upper inner race of this next bearing Z and thence the ball array Z into the lower outer race 82 with again a residual force being transmitted through the spacer members through the inner spacer member 92 to the lowermost inner race of the last bearing assembly housing balls X. The forces in the lower outer race of the preceding bearings Z are transmitted to the upper outer race of this bearing X and then through the lowermost outer spacer member which is engaged by a shoulder on the outer housing 16.

It is seen through the above description of the axially transmitted thrust forces that whereas each of the two bearing stacks consists of four complete bearing assemblies, the bearing assemblies are oriented so that the balls of adjacent assemblies take thrust load only in opposite direction. Thus, during the condition when the weight-on bit exceeds the piston effect, as depicted by the upwardly directed arrows, it is seen that the balls Z in the first and third bearing assemblies are essentially unloaded and no thrust force is transmitted therethrough with such force being transmitted through the balls X of the second and fourth bearing assemblies; however, when the resultant thrust forces are in the opposite direction as when the piston effect exceeds bit load, the balls X of the second and fourth bearing assemblies are essentially unloaded and the axial thrust force is transmitted through the balls Z of the first and third bearings of this lower bearing stack.

The above description of the transmission of the various forces through the bearing stack is based on an ideal situation wherein the tolerances of the stack permit transmission of the forces exclusive of an overload condition, equally throughout; however, it is well known that manufacturing and assembly tolerances will not permit equal distribution of the forces and that the bearings must wear into a situation where the forces are shared. If the bearing components are fabricated from a high-wear material for longer wear life, the initially loaded bearing components, in the arrangement just described, would not readily wear and, due to the repeated high unit loading between the spherical balls and the race members, the high thrust load would be transmitted through such high unit loading in a repetitive manner inducing a fatigue into the individual balls prior to the time there had been sufficient wear to accommodate sharing the load.

In accordance with the present invention, the races of the bearing components are made of the relatively soft material with respect to the hardness of the ball members so that the races of the initially loaded bearing components wear sufficiently readily and prior to any fatigue or spalling being induced therein, to a condition where the load is transmitted therethrough and sheared by the remaining bearing assemblies which are oriented to accept load in such direction. Thus, assuming that the forces are as shown with the downwardly directed arrows of FIG. 3, and further assuming that the uppermost bearing assembly, due to the manufacturing tolerances, make contact through the balls Z prior to any contact between the like races and balls Z of the third bearing assembly, operation of the tool would require that the races of the upper bearing assembly wear sufficient until there is contact between the races and balls of the third bearing assembly at which point that bearing assembly would initially begin sharing the load. However, the load would not be equally distributed until sufficient wear on the upper bearing assembly has occurred and thereafter, with the loads being equal, wear would continue in an equal fashion so that the loads would continually be shared equally. With the materials above described, such sharing of the load would occur considerably prior to any fatigue or spalling being induced by the initial loading of the upper bearing. Similarly, when the thrust is in the opposite direction, over a period of time the first loaded bearing would be worn to a condition where the loads are shared between it and the next bearing in a like manner.

it should be noted in the configuration described that there are two bearing assemblies in each bearing stack which support the axial forces in one axial direction. Thus, it may be, that the initial load is assumed by a bearing assembly in one stack which, when it becomes worn, permits a bearing assembly within that stack or within the other stack to begin sharing the load. It would depend upon the relative tolerances between the rolling members and the opposed races to determine which of the next bearing assemblies would be the one to share the load. Further, after the next bearing assembly begins to share the load and becomes worn, either of the two remaining or both of the two remaining bearing assemblies will also begin to then share the load so that they will thereafter tend to wear in accordance with the amount of load imposed on each assembly until the load is shared equally amongst all the bearing assemblies oriented for accepting the load in that direction.

Further, it has been found that nearly uniform wear within each rolling element of each array 86 can be attained when caged with a cage 88 having a substantial cross section if high strength material and wear characteristics to promote relatively long wear life and permitted by the particular bearing configurations shown.

It also should be noted that deformation of the spacer members, and other components in the bearing stack, due to high thrust loads also contribute to slight axial realignment of the components and contribute somewhat to the ability of the bearing assemblies within the stack to share the thrust load. However, the load sharing capabilities are significantly improved when the bearing races and rolling members are constructed in accordance with the present invention.

We claim:

1. In a drilling tool having an outer cylindrical member, an inner cylindrical member in radial spaced relation therewith, and bearing means for supporting said members for relative rotation and transmitting thrust load therebetween, said bearing means comprising:

a plurality of axially stacked rolling bearing assemblies, each assembly comprising an inner race attached to said inner member and an outer race attached to said outer member and rolling means disposed for rolling engagement with said races; and means for distributing the thrust load on said rolling means of certain of said rolling bearing assemblies generally equally, said means comprising:

at least one of the races of each certain assembly being formed of a bearing material significantly softer than said rolling means whereby, whichever of said certain bearing assemblies that is subjected to the initial thrust load is readily worn to a condition that distributes the load to the certain assembly next subjected to the greatest thrust load which in turn is worn in accordance with the load received so that the wear of the races of each said assembly promotes equal distribution of the load therebetween.

2. Structure according to claim 1 wherein both races of each said bearing assemblies are generally the same Rockwell hardness.

3. Structure according to claim 1 wherein the Rockwell hardness of said race is generally within the range of 42–46 Rockwell C and the Rockwell hardness of said rolling elements is in the range of 56–60 Rockwell C.

4. Structure according to claim 1 wherein the difference in Rockwell hardness between the race and the rolling elements of said certain assemblies is in the range of 10–18 Rockwell C.

5. Structure according to claim 3 wherein the races are fabricated from a steel with through hardness capabilities and the balls are fabricated from a tool steel.

6. An improved downhole drilling motor including a cylindrical external member, a relatively rotatable cylindrical internal member defining therebetween a vertically oriented bearing chamber and bearing means housed therein for supporting said members for relative rotation and transmitting thrust load between said members, said bearing means comprising a plurality of axially stacked rolling bearing assemblies, each assembly comprising an inner race attached to said inner member and an outer race attached to said outer member and rolling means disposed for rolling engagement with said races and wherein the improvement comprises:

means for distributing the thrust load on said rolling means of certain of said assemblies generally equally, said means comprising:

at least one of the races of each certain assembly being formed of a bearing material significantly softer than said rolling means whereby, whichever of said bearing assemblies that is subjected to the initial thrust load is readily worn to a condition that distributes the load to the certain assembly next subjected to the greatest thrust load which in turn is worn in accordance with the load received so that the wear of the races promotes equal distribution of the load therebetween.

7. Structure according to claim 6 wherein both races of each said bearing assemblies is generally the same Rockwell hardness.

8. Structure according to claim 7 wherein the races are fabricated from a steel with through hardness capabilities and the balls are fabricated from a tool steel.

9. Structure according to claim 6 wherein the Rockwell hardness of said race is generally within the range of 42–46 Rockwell C and the Rockwell hardness of said rolling elements is in the range of 56–60 Rockwell C.

10. Structure according to claim 6 wherein the difference in Rockwell hardness between the race and the rolling elements is in the range of 10–18 Rockwell C.

11. A bearing assembly comprising a series of separate roller bearing means oriented for transmitting thrust load to the rolling element thereof, said means comprising an inner race, an outer race, and said rolling elements in rolling engagement therebetween and means for generally equally distributing the thrust load through the rolling element of at least certain of said separate roller bearing means in said assembly, said means comprising:

at least one of the races of each said certain of said separate roller bearing means formed of a material significantly softer on a Rockwell hardness scale than the roller bearing element of the same rolling means.

12. Structure according to claim 11 wherein both races of each said bearing assemblies are generally the same Rockwell hardness.

13. Structure according to claim 11 wherein the Rockwell hardness of said race is generally within the range of 42–46 Rockwell C and the Rockwell hardness of said rolling elements is in the range of 56–60 Rockwell C.

14. Structure according to claim 14 wherein the difference in Rockwell hardness between the race and the rolling elements is in the range of 10–18 Rockwell C.

15. Structure according to claim 13 wherein the races are fabricated from a steel with through hardness capabilities and the balls are fabricated from a tool steel.

* * * * *